United States Patent Office 2,699,445
Patented Jan. 11, 1955

2,699,445

PROCESS OF PRODUCING ESTERS OF 3-KETOPIMELIC ACID

Giulio Natta and Piero Pino, Milan, Italy

No Drawing. Application July 1, 1952,
Serial No. 296,758

Claims priority, application Switzerland July 7, 1951

10 Claims. (Cl. 260—483)

This invention relates to a process for carrying out condensation reactions with acetylene in the presence of catalysts, wherein pressures above 50 atmospheres are employed and the reaction medium consists of a liquid in which the acetylene is soluble, the acetylene being so mixed with other gases or vapours that it has a low partial pressure in the gas phase.

In this process, there are obtained by the action of carbon monoxide on a solution of acetylene in an alcohol, e. g. methanol or butyl alcohol, under pressures of 80–220 atmospheres and at temperatures of 130–170° C., reaction products which contain mainly dicarboxylic acids containing 4 carbon atoms, such for example as succinic acid and fumaric acid, as well as acrylic acid and the esters of these acids.

It has now been found according to this invention that it is possible to produce by the said condensation reaction, products which consist partly of esters of 3-ketopimelic acid, if the reaction is carried out at pressures above 50 atmospheres, preferably at 200–400 atmospheres, but at lower temperatures below 120° C., preferably at 80 to 100° C.

These esters of 3-ketopimelic acid have the following formula:

wherein R is an organic radical (alkyl or aryl).

As reaction product, there is obtained a mixture of various esters, such as those of succinic acid, fumaric acid, maleic acid and acrylic acid. An essential feature is that this mixture contains a certain proportion, for example at least 5% of 3-ketopimelates (corresponding to 13.5 gm. of the dimethyl ester of 3-ketopimelic acid per 100 gm. of acetylene employed). By reducing the proportion between the alcohol and acetylene in the initial materials, that is to say, by increasing the quantity of acetylene in relation to the alcohol, for example to about 50 litres of acetylene (under normal conditions) for 100 gm. of methanol, the ratio of the ester of 3-ketopimelic acid in the end products can be increased, so that they contain up to 40% thereof.

The acetylene is preferably dissolved in the alcohol which is a component of the reaction. It is advantageous to employ as solvent the esters formed in the reaction, which have a lower boiling point than the ketopimelates, and to return them to the reaction. Such esters may be, for example, the methyl and ethyl esters of succinic acid.

The reaction is carried out in the presence of catalysts of the type suitable for the reaction between olefines and carbon monoxide, such for example as metals of the iron group, or halides thereof. Catalysts containing cobalt are particularly suitable, since they require short induction periods. Cobalt alone, for example in the form of Raney cobalt, may be employed.

Example 1

80 gms. of methanol containing 5 gm. of a Raney cobalt catalyst in suspension are introduced into an autoclave having a capacity of 300 cc. Seven litres of acetylene is introduced and carbon monoxide is introduced until a pressure of 250 atmospheres is reached, and the autoclave is shaken and heated at 85° C. until no further absorption is observed at pressures higher than 200 atmospheres. The autoclave is cooled and the gaseous components are removed. Ten more litres of acetylene is introduced and carbon monoxide is introduced until the pressure amounts to 200 atmospheres, and the procedure described above is followed.

These operations are repeated 5 times, whereafter the products obtained are removed and fractionated. The fraction which boils between 150° C. and 170° C. under 15 mms. and which solidifies completely on cooling, consists for the greater part of the methyl ester of 3-ketopimelic acid. It was possible to extract 20 gm. of this ester therefrom. The yield by weight of the ketopimelates in relation to the acetylene employed amounts to about 50%.

Example 2

In the same way as in Example 1, 2.7 litres of acetylene (measured at normal pressure) per 80 gm. of methanol were introduced and this operation was repeated 5 times. A considerable excess of methanol was then constantly present. It was possible to obtain from the reaction products by distillation a mixture which contained the methyl esters of ketopimelic acid, of succinic acid, of fumaric acid and of maleic acid. The yield by weight of diester amounts to 51.2 g. of which about 7% are ketopimelates. This is lower than in Example 1 because a lower acetylene concentration was employed than in Example 1.

What we claim is:

1. A process of producing esters of 3-ketopimelic acid, comprising the steps of heating an alcohol solution of acetylene in the presence of a catalyst selected from the group consisting of iron, cobalt and halides thereof at a temperature between 80 and 120° C. in an atmosphere of carbon monoxide at a pressure of at least 50 atmospheres so as to form a reaction mass including esters of 3-ketopimelic acid; and separating said esters of 3-ketopimelic acid from the remainder of said reaction mass.

2. A process of producing esters of 3-ketopimelic acid, comprising the steps of heating an alcohol solution of acetylene in the presence of a catalyst selected from the group consisting of iron, cobalt and halides thereof at a temperature of 80–100° C. in an atmosphere of carbon monoxide at a pressure of at least 50 atmospheres so as to form a reaction mass including esters of 3-ketopimelic acid; and separating said esters of 3-ketopimelic acid from the remainder of said reaction mass.

3. A process of producing esters of 3-ketopimelic acid, comprising the steps of heating an alcohol solution of acetylene in the presence of a catalyst selected from the group consisting of iron, cobalt and halides thereof at a temperature between 80 and 120° C. in an atmosphere of carbon monoxide at a pressure of 200–400 atmospheres so as to form a reaction mass including esters of 3-ketopimelic acid; and separating said esters of 3-ketopimelic acid from the remainder of said reaction mass.

4. A process of producing esters of 3-ketopimelic acid, comprising the steps of heating an alcohol solution of acetylene in the presence of a catalyst selected from the group consisting of iron, cobalt and halides thereof at a temperature of 80–100° C. in an atmosphere of carbon monoxide at a pressure of 200–400 atmospheres so as to form a reaction mass including esters of 3-ketopimelic acid; and separating said esters of 3-ketopimelic acid from the remainder of said reaction mass.

5. A process of producing esters of 3-ketopimelic acid, comprising the steps of heating an alcohol solution of acetylene in the presence of Raney cobalt at a temperature between 80 and 120° C. in an atmosphere of carbon monoxide at a pressure of at least 50 atmospheres so as to form a reaction mass including esters of 3-ketopimelic acid; and separating said esters of 3-ketopimelic acid from the remainder of said reaction mass.

6. A process of producing esters of 3-ketopimelic acid, comprising the steps of heating in alcohol solution of acetylene in the presence of Raney cobalt at a temperature of 80–100° C. in an atmosphere of carbon monoxide at a pressure of 200–400 atmospheres so as to form a reaction mass including esters of 3-ketopimelic acid; and separating said esters of 3-ketopimelic acid from the remainder of said reaction mass.

7. A process of producing esters of 3-ketopimelic acid, comprising the steps of heating an alcohol solution of acetylene consisting of about 15–50 liters acetylene per each 100 gm. alcohol in the presence of a catalyst selected from the group consisting of iron, cobalt and halides thereof at a temperature between 80 and 120° C. in an atmosphere of carbon monoxide at a pressure of at least 50 atmospheres so as to form a reaction mass including esters of 3-ketopimelic acid; and separating said esters of 3-ketopimelic acid from the remainder of said reaction mass.

8. A process of producing esters of 3-ketopimelic acid, comprising the steps of heating a solution of acetylene dissolved in methanol in the presence of a catalyst selected from the group consisting of iron, cobalt and halides thereof at a temperature between 80 and 120° C. in an atmosphere of carbon monoxide at a pressure of at least 50 atmospheres so as to form a reaction mass including esters of 3-ketopimelic acid; and separating said esters of 3-ketopimelic acid from the remainder of said reaction mass.

9. A process of producing esters of 3-ketopimelic acid, comprising the steps of heating a solution of about 50 liters acetylene dissolved in each 100 gm. methanol in the presence of a catalyst selected from the group consisting of iron, cobalt and halides thereof at a temperature between 80 and 120° C. in an atmosphere of carbon monoxide at a pressure of at least 50 atmospheres so as to form a reaction mass including esters of 3-ketopimelic acid; and separating said esters of 3-ketopimelic acid from the remainder of said reaction mass.

10. A process of producing esters of 3-ketopimelic acid, comprising the steps of heating an alcohol solution of acetylene in the presence of a catalyst selected from the group consisting of iron, cobalt and halides thereof at a temperature between 80 and 120° C. in an atmosphere of carbon monoxide at a pressure of at least 50 atmospheres so as to form a reaction mass including esters of 3-ketopimelic acid; cooling the thus formed reaction mass; removing the gaseous components from said reaction mass; repeating said heating of an alcohol solution of acetylene with the additional presence of the non-gaseous components of said reaction mass, thereby forming esters of 3-ketopimelic acid; and recovering said esters of 3-ketopimelic acid.

References Cited in the file of this patent

UNITED STATES PATENTS

| | | |
|---|---|---|
| 2,562,393 | Reppe | July 31, 1951 |
| 2,577,208 | Reppe | Dec. 4, 1951 |